United States Patent [19]

Sneider

[11] 4,144,845
[45] Mar. 20, 1979

[54] BAG FOR PETS WITH ACCESS OPENINGS THEREIN FOR APPLYING FLEA KILLING SPRAY

[76] Inventor: Vincent R. Sneider, 3422 Hallcrest Dr., N.E., Atlanta, Ga. 30319

[21] Appl. No.: 804,344

[22] Filed: Jun. 7, 1977

[51] Int. Cl.² ............................................. A01K 29/00
[52] U.S. Cl. .................................................. 119/160
[58] Field of Search .................. 119/160, 158; 54/79, 54/24

[56] References Cited

U.S. PATENT DOCUMENTS

| 2,033,357 | 3/1936 | Riker | 119/160 |
|---|---|---|---|
| 3,150,641 | 9/1964 | Kesh | 119/160 |
| 3,605,384 | 9/1971 | Pacini | 54/24 |
| 3,677,263 | 7/1972 | Allen | 119/158 |
| 3,742,679 | 7/1973 | Jordan | 54/79 |
| 3,749,064 | 7/1973 | Weinstein | 119/158 |

Primary Examiner—Hugh R. Chamblee
Attorney, Agent, or Firm—Ralph R. Roberts

[57] ABSTRACT

A bag for pets, particularly dogs, is made of impervious flexible material. A slide closure opening at the top allows the pet to be placed in the bag. Closure is by the slide fastener at the top and draw strings at the four terminal ends of the legs and around the neck of the pet leaving the head and paws exposed. Through appropriately positioned nozzle conduits the spray is introduced into the bag. Deflectors at the end of each nozzle conduit prevent direct contact of the induced spray on the skin of the pet within the bag. Absorbent pads or discs at the conduits receive and retain any droplets of spray for later evaporative release.

6 Claims, 5 Drawing Figures

BAG FOR PETS WITH ACCESS OPENINGS THEREIN FOR APPLYING FLEA KILLING SPRAY

BACKGROUND OF THE INVENTION

1. Field of the Invention

With reference to the classification of art as established in the United States Patent and Trademark Office, the present invention is found in the general Class entitled, "Fishing, Trapping and Vermin Destroying" (Class 43) and the subclass entitled, "Vermin Destroying" (subclass 134). Also of note is the general Class entitled, "Animal Husbandry" (Class 119) and the subclass entitled, "Antivermin Treatment — fumigating" (subclass 160).

2. Description of the Prior Art

Killing or otherwise removing fleas and the like from pets has been a problem ever since the pets were permitted in the home. Widely advertised and extensively used are chemical preparations including soaps, collars and sprays. Soaps and sprays often do not contact and kill all the infestation present on the pet. Collars that contain chemicals must be left in place for a period of time which may be several weeks. During this time an irritation to the proximal skin of the pet often occurs. Bags for carrying pets or for placing a just-washed pet are known and are shown in United States Patents. Among these patents are U.S. Pat. Nos. 3,108,568 which issued to R.E. WHITNEY on Aug. 22, 1962; 3,150,641 which issued to S. KESH on Sept. 29, 1964 and 2,408,575 which issued to A. NORVIG on Sept. 18, 1943.

To the best knowledge and belief of the inventor, it is novel to provide a bag constructed of flexible material impervious to the passage of a spray material which kills fleas, ticks, etc. To insure that a spray penetrates all the fur of the pet to be treated and that droplets or excess concentration do not accidently contact the skin of the pet, the bag has a multiplicity of access openings providing conduits from the nozzle of the spray can to the interior of the bag. Each conduit on the inside terminates at a deflector which directs any spray, and particularly droplets, from direct contact with the fur and/or skin of the pet.

SUMMARY OF THE INVENTION

This invention may be summarized at least in part with reference to its objects.

It is an object of this invention to provide, and it does provide, a bag for pets in which are provided access openings through which is directed a flea killing spray. These openings include conduits whose inner ends have a deflector which is so constructed and positioned that a direct spray or droplets cannot reach the skin of the pet.

In brief, this invention provides a bag of impervious flexible material which has tie closures for the feet and head. A slide fastener, which additionally provides a more-or-less gastight seal, also is employed for the placing of the pet in the bag. With the pet in the bag and the ties drawn to the desired tightness, a spray can of the desired antivermin mixture is applied to the several access openings provided in the bag. Each access opening includes a conduit which extends a short distance inwardly of the bag wall and in this inner end is a dispersion shield and deflector by which spray and droplets are prevented from impinging contact with the skin of the pet.

In addition to the above summary the following disclosure is detailed to insure adequacy and aid in understanding of the invention. This disclosure, however, is intended to cover each new concept no matter how it may later be disguised by variations in form or additions of further improvements. For this reason there has been chosen a specific embodiment of the bag for pets with access conduits therein for applying flea killing spray as adopted for use with a spray container of the antivermin mixture and showing a preferred means for construction of the bag. This specific embodiment has been chosen for the purposes of illustration and description as shown in the accompanying drawing wherein:

BRIEF DESCRIPTION OF THE DRAWING

In the following description and in the claims various details will be identified by specific names for convenience. These names, however, are intended to be generic in their application. Corresponding reference characters refer to like members throughout the five figures of the drawing.

Figure 1:
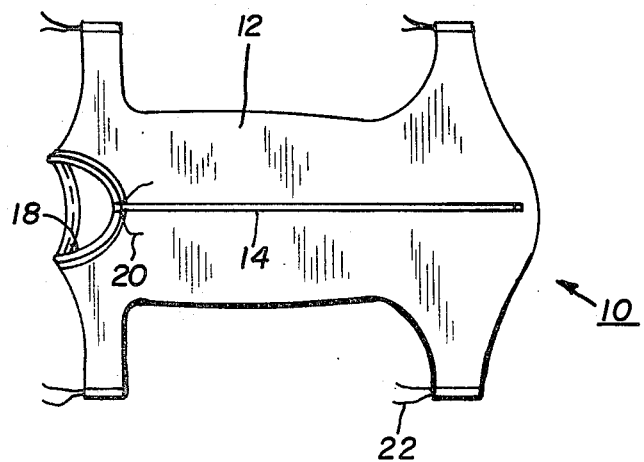
FIG. 1 represents a diagrammatic showing of a single extent of flexible impervious sheet material as may be cut to form the bag of this invention.

The drawing accompanying, and forming part of, this specification discloses certain details of construction for the purpose of explanation but it should be understood that structural details may be modified without departure from the concept and principles of the invention and that the bag for pets may be incorporated in other forms than shown.

DESCRIPTION OF THE PREFERRED EMBODIMENT

In the drawing there is depicted a bag for pets in which all of the pet but the paws and head is encased in an impervious flexible bag, generally identified as 10. Preferably, this bag is constructed from one piece of material which may be a plastic sheet of impregnated or coated cloth, which sheet material will inhibit the passage of the spray to be used. The bag may be cut from a single piece of material and in a laid-flat condition, as shown in FIG. 1, have extension portions for the legs. This laid-flat piece, identified as 12, has a slide fastener closure 14. This slide fastener closure 14 terminates before the extreme rear of the bag. At or around the neck of a pet, identified as 16, there is provided a collar 18 having a draw tie or string 20. Each of the leg portions is provided with a string or tie 22 at its lower end. It is also contemplated that the leg portions may be made long enough to cover and enclose the paws of the pet. If the leg portions of the bag are open, the ties 22 are used to draw the leg portions tight to the legs at a point just above the paws. If the leg portions are closed, then the ties are not required. With the pet 16 inside the bag and the neck and legs tied, the slide fastener is closed and the inside of the bag is substantially excluded from leaking any spray introduced therein.

Figure 2:
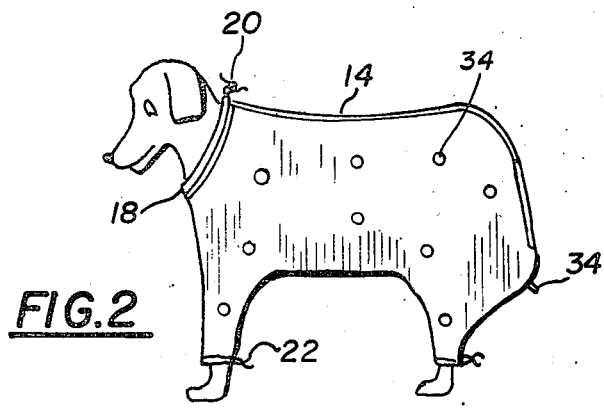
FIG. 2 represents a side view of the bag with a pet retained therein and with the neck and leg portions of the bag secured to the pet by ties and with the slide closure opening portion closed.
Figure 3:
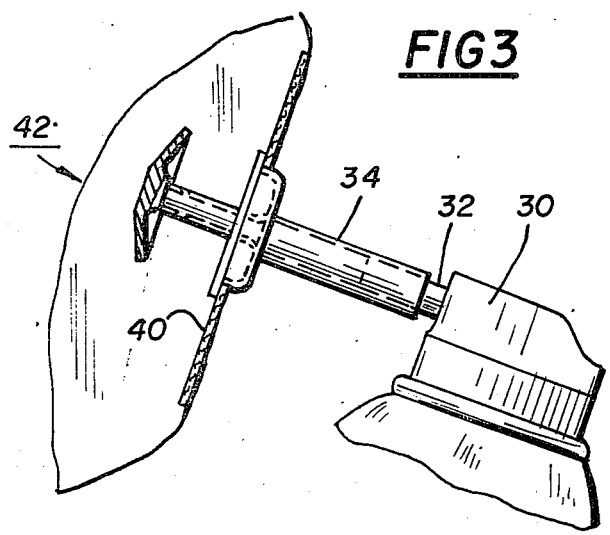
FIG. 3 represents in an enlarged scale a diagrammatic sectional view showing a preferred construction for the access opening and a dispersion shield and deflector at the end thereof; this conduit, as shown also having an absorbent disc disposed around the entering conduit.
Figure 5:
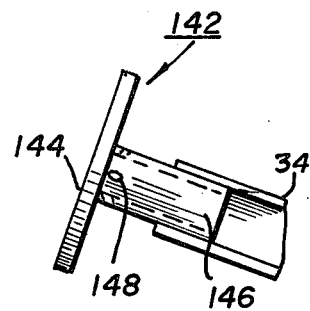
FIG. 5 is a fragmentary side view of a diffuser-deflector plug similar to that of FIG. 4 but with the stem of tubular construction and with the spray outlets formed in this tubular stem.
Figure 4:
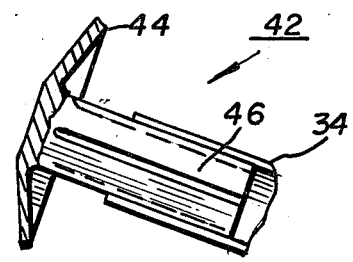
FIG. 4 is a fragmentary side view of a diffuser-deflector plug having a fluted stem for carrying a spray mixture.

Reference is now made to FIGS. 3, 4 and 5 and in particular to a small extent to FIG. 2 in the random location of spray inlets. A spray container of a flea killing mixture is indicated as 30 and has a nozzle portion 32 which is a tight fit in a conduit 34. This conduit is shouldered and is preferably of plastic although a malleable metal such as an aluminum tube may be used. An aperture is formed in the sheet material 12 and the inner end of the conduit 34 is mounted in this aperture. A grommet 36 and a washer 38 secures the conduit to the sheet material. Preferably the washer securing the conduit to the sheet material can and does secure a sponge-like or blotting paper disc 40 which acts as an absorbent member which receives and retains any droplets of sprayed material.

In the inner end of the conduit 34 is mounted a diffuser-deflector plug generally identified as 42. This plug has a disc portion 44 and extending from a center portion of one side is a fluted stem 46 as seen in enlarged detail in FIG. 4. This fluted stem with its grooves 48 provides, in a mounted condition, a plurality of passageways for the flow of spray through the conduit 34. This spray is prevented from a direct impingement on the pet by the disc 44. This stem preferably has a small amount of inward slope, as shown, so that spray and droplets are deflected outward toward the wall of the bag. The absorbing disc 40 receives and retains any excessive moisture-like particles of spray and provides an evaporation reservoir of flea killing material as and after the spray container 30 has been moved to another conduit or has been removed from the bag and pet.

In FIG. 5 is an alternate construction of a diffuser-deflector 142 in which a disc portion 144 is generally flat and a stem portion 146 is generally tubular and has a plurality of apertures 148 which preferably are directed away from the disc 144 and when mounted directs the spray toward the bag.

OPERATION

The bag is assembled with all seams sealed. A number of conduits are provided in each bag, the number and position determined by the size of the bag and pet to be treated. The slide fastener 16 and collar are opened for placing the pet in the bag. The slide fastener is closed and the ties around the neck and paws are drawn to make a bag a substantially closed, impervious envelope around the pet. The spray container 30 is brought to a selected conduit 34 and the nozzle 32 is made a tight fit into the entryway of the conduit.

The spray in the container is now released to flow through the conduit to and from the outlets in and around the diffuser-deflector plug. The spray vapor enters the bag but direct contact with the skin of the pet is prevented by the diffuser. Droplets or a heavy spray concentration is absorbed by the sponge or blotter 40 for slow release into the permeated atmosphere surrounding the pet. The small openings for the entrance of the spray into the bag in each of the conduits provide pressure vents and prevent any undue ballooning of the bag when and as other conduits are used to conduct the spray to the pet.

This bag provides a means for safely killing the fleas and like vermin on the pet without a heavy concentration of spray on the skin of the pet. The spray can be safely induced into the fur of the pet without a direct application of spray. Whether the diffuser of FIGS. 4 or 5 is affixed in the ends of the several conduits or a sponge or blotter 40 is used therewith, a direct spray to the skin is prevented.

The slide fastener 16 may be the plastic channel closure device used on many plastic bags and envelopes. A zipper using metal or plastic toothed members may also be used. A flat at the neck tie and end of the slide closure may be used to provide a seal of this joining opening. Whether a plastic sheet or impregnated fabric is utilized is merely a matter of choice. The tie around the neck and paws of the pet may be a shoelace-type of material or may be Velcro (TM) type fastener. The seaming of the bag may be by heat sealing, cement, stitching or a combination thereof. There are many known conventional means of fastening sheet material to provide impervious seams. Many such seams are formed in the manufacture of rainwear and the selection of the method must also take in economics, material, etc.

The stem of the closure disc-diffuser in FIGS. 4 and 5 has been shown as providing the outlets for the spray but it is also to be noted that the stem may be made solid or tubular with no holes and that the outlet holes for the spray may be formed on the inner end of the conduit 34.

Terms such as "up", "down", "bottom", "top", "front", "back", "in", "out" and the like are applicable to the embodiment shown and described in conjunction with the drawing. These terms are merely for the purposes of description and do not necessarily apply to the position in which the bag and the spray conduits therein may be constructed or used.

While a particular embodiment of the bag for pets with access openings for spray applications have been shown and described it is to be understood that modifications may be made within the scope of the accompanying claims and protection is sought to the broadest extent the prior art allows.

What is claimed is:

1. A flexible bag for pets and providing a temporary encasement of the pet therein in a substantially closed condition and providing for the introduction of a spray killing material, the bag including: (a) at least one piece of impervious sheet material cut to a selected contour and providing therewith a bag when seamed together at appropriate joining areas; (b) a collar portion provided with a draw closure means by which the collar of the bag is drawn tightly to and around the neck of the pet while the head of the pet is outside the bag and is open to the atmosphere; (c) a slide fastener-type closure mounted along a longitudinal extent of the bag, this slide fastener and the collar portion closure when open permitting the placing in and taking out of the pet from the bag and when closed this slide fastener closure substantially seals this opening against the unwanted escape of spray when introduced into the bag; (d) leg portions formed in the bag and having means for closing the end portions of each leg portion to prevent a leak of spray from the end portions while providing means for a spray to pass from the body portion to and down each leg portion; (e) a plurality of tubular spray conduits each mounted in a selected portion of the bag material, each conduit having its outer end adapted to receive and tightly engage a nozzle of a spray container of insect killer and with the inner end of the conduit disposed within the bag and having a closure disc mounted in the end of the conduit and spaced a short distance in from the bag wall, this disc in addition to closing the end of said conduit to the passage of any spray also is so formed as to provide a deflector which in combination with the tubular conduit has a plurality of outlet passageways which are so directed that a spray passage through the conduit from the outer inlet is deflected from its inward path and into the interior of the bag, the pressurized spray prevented by the deflector from a direct contact with the skin of the pet.

2. A flexible bag for pets as in claim 1 in which the bag is made of plastic.

3. A flexible bag for pets as in claim 1 in which the bag is made of impregnated fabric.

4. A flexible bag for pets as in claim 1 in which each conduit for spray has an absorbent sheet member secured at each conduit with each sheet member secured to lay against the inner surface of the bag and around the conduit, said absorbent material so disposed as to receive any spray in liquid form exiting from the conduit outlets.

5. A flexible bag for pets as in claim 1 in which the closure disc has a fluted stem, said fluted stem forming and providing said outlet passageways and the disc portion is bowed toward the stem sufficiently for the spray exiting from the fluted passageways to be directed toward the wall of the bag.

6. A flexible bag for pets as in claim 1 in which the closure disc has a tubular stem with a plurality of holes formed in the stem and providing the outlet passageways sloped to carry the exiting spray from the closure disc and toward the wall of the bag.

* * * * *